United States Patent [19]
Takada

[11] Patent Number: 5,450,580
[45] Date of Patent: Sep. 12, 1995

[54] DATA BASE RETRIEVAL SYSTEM UTILIZING STORED VICINITY FEATURE VALVES

[75] Inventor: Hiroshi Takada, Tokyo, Japan

[73] Assignee: Nippon Steel Corporation, Tokyo, Japan

[21] Appl. No.: 873,130

[22] Filed: Apr. 24, 1992

[30] Foreign Application Priority Data

| Apr. 25, 1991 | [JP] | Japan | 3-122766 |
| Dec. 24, 1991 | [JP] | Japan | 3-356348 |
| Dec. 26, 1991 | [JP] | Japan | 3-357900 |
| Dec. 27, 1991 | [JP] | Japan | 3-359675 |
| Feb. 7, 1992 | [JP] | Japan | 4-056964 |
| Feb. 7, 1992 | [JP] | Japan | 4-056965 |

[51] Int. Cl.$^6$ ............................................. G06F 17/30
[52] U.S. Cl. ............................ 395/600; 395/3; 395/900; 395/934; 364/DIG. 1; 364/282.1; 364/283.1; 364/274; 364/274.6
[58] Field of Search .................... 395/600, 425, 3, 900, 395/934; 364/715.02

[56] References Cited

U.S. PATENT DOCUMENTS

| 4,422,158 | 12/1983 | Galie | 395/600 |
| 4,839,853 | 6/1989 | Deerwester et al. | 395/600 |

FOREIGN PATENT DOCUMENTS

| 2-78323 | 3/1990 | Japan . |
| 3-125263 | 5/1991 | Japan . |
| 3-174652 | 7/1991 | Japan . |
| WO89/11699 | 11/1989 | WIPO . |

OTHER PUBLICATIONS

Gerhardt, Friedrich, 'Text Signatures by Superimposed Coding of Letter And Quadruplets', Information Systems, vol. 12, No. 2, 1987, pp. 151–156.

Nelson, Michael J. 'Comparison of Signature and Inverted Files', Canadian Journal For Information Science, vol. 13, No. 3/4, Dec. 1988, pp. 79–89.

Owolabi, O. et al., 'Fast Approximate String Matching', Software-Practice and Experience, vol. 18, No. 4, Apr. 1988, pp. 387–393.

Primary Examiner—Paul V. Kulik
Attorney, Agent, or Firm—Kenyon & Kenyon

[57] ABSTRACT

A data base retrieval system includes a memory for storing vicinity feature values of data records as search (or retrieval) objects of the data records. The vicinity feature values indicate a correspondence between data characters of the data records which are in the same vicinity. A searching device obtains matching degrees between a vicinity feature value of a search (or retrieval) key and the vicinity feature values of the search objects of the data records. Data record numbers are output arranged in a descending order of the matching degrees. Since phase information of data (position information indicating the position of a search key in a record) as a factor for prolonging the search time upon execution of full-record direct searching is abstracted by a vicinity feature value calculation, a high-speed and fuzzy searching operation can be performed so that the search time depends only on the length of the search key information, and does not depend on the volume of data.

39 Claims, 8 Drawing Sheets

DATA BASE RETRIEVAL SYSTEM UTILIZING STORED VICINITY FEATURE VALVES

BACKGROUND OF THE INVENTION

The present invention relates to a data base retrieval system for extracting necessary information from a data base.

In an existing data base searching technique, keyword addition is generally used as a search space compression method. When the number of objective records is relatively small, a full-record search method can be used. For example, the Boyer-Moore method has been proposed as an efficient full-record search method. Furthermore, an index method for automatically extracting a keyword from a search object, and generating an index is also known.

The keyword search method suffers from the following drawbacks:

(1) A keyword must be added to each record;

(2) When arbitrary keywords are added, the number of keywords becomes very large, therefore, management using, e.g., a thesaurus is required, and considerable maintenance costs are required; and (3) Since keywords to be added are not always proper, a search omission occurs.

More specifically, in the existing data base retrieval method, especially when the number of documents (i.e., the number of records) becomes very large, there is a tendency for performance not to be improved in proportion to required cost.

On the other hand, in a full-record search method, the above-mentioned problems are not posed. However, in an existing direct search method, when the number of records becomes very large, the search time considerably exceeds the interrogation time range, and is not practical. The full-record search method is based on complete coincidence, and cannot perform fuzzy coincidence searching. In the full-record search method based on the Boyer-Moore method, data other than a document (e.g., such as physical time-series data) cannot be processed.

As a method for performing full-record searching, a method disclosed in Japanese Patent Laid-Open No. 3-174652 is known. In this method, an index table, i.e., a character component table using entry characters as indices is formed in advance on the basis of search objective records, thereby narrowing the search range upon execution of full-record searching. However, since full-record searching is performed in the narrowed search range, the search time is long, and fuzzy coincidence searching cannot be performed.

Furthermore, the index method is suitable for documents such as English texts in which words are separated since the unit of information in such documents is a word. In this case, the index method requires some syntax analysis. The index method is not suitable for documents such as Japanese texts in which words are not separated. Furthermore, since a dictionary including all the possible sets of expressional variations of words must be formed, the system load is considerable.

Japanese Patent Laid-Open No. 3-125263 discloses a search method using a plurality of continuous character strings as indices. However, this method also performs complete coincidence searching, and cannot perform incomplete coincidence searching (i.e., fuzzy coincidence searching).

Such a data base retrieval system is required to compress and decode data to decrease the volume of data to be searched and reduce the required memory capacity.

The Huffman method, the Shannon-Fano method, the Gilbert-Moore method, the run-length coding method, and the like are known as typical methods of compressing and decoding data. Japanese Patent Laid-Open No. 2-78323 discloses a technique using the Huffman method.

A method for fixing the size of all the records (e.g., an L-byte length) is known to attain high-speed data storage and reference (access) operations to a data base when data to be searched has a variable length. According to this method, when an n-th record is to be accessed, an $n \times L$ byte position from the start address of a file can be read, and the storage location can be designated at a high speed. However, in this method, since the record size is set to be constant, insignificant dummy characters must be added to data having a smaller length than the predetermined size, and the data size is undesirably increased.

In contrast to this, according to a method of continuously writing variable-length data in a storage medium, insignificant dummy characters need not be added, and it is not necessary to increase the data size. However, according to this method, since various data record sizes are used, the records must be referred to sequentially in an access mode, and the reference (storage) position cannot be immediately obtained. Therefore, the access speed is decreased.

As described above, the conventional variable-length data storage and reference methods suffer from at least one of two drawbacks, i.e., an increase in data size and a decrease in access speed.

The above-mentioned data base retrieval system checks whether or not records include a search key and lists as a search result data records including the search key.

The list of the search results is formed and preserved. However, when the number of records is large, or when the search results are sequentially preserved, since the volume of data preserved in the list is large, a memory device for storing the data requires a large memory capacity. Since a time required for forming the list of the search results is prolonged, search work efficiency deteriorates.

In the above-mentioned searching operation, when searching is performed using a conditional expression (searching expression) consisting of a plurality of search keys, the conditional expression is formed by the plurality of search keys, and searching is performed using the formed expression. For example, a conditional expression ((A or B or C) and D) is formed by keys A, B, C, and D, and full-record searching is performed using this expression.

However, since such a searching operation uses a conditional expression consisting of a plurality of keys, the search time is very long, and cost performance is low when a condition is not satisfied. When searching is performed using a similar conditional expression, e.g., a conditional expression ((A or B or C) and E) similar to the above-mentioned conditional expression, a partial logical condition (A or B or C) of searching that has already been calculated cannot be re-utilized and must be searched again, resulting in poor efficiency.

SUMMARY OF THE INVENTION

In consideration of the above situation, the present invention provides a data base retrieval system which can attain full-record searching, can remarkably shorten the search time, and can also attain fuzzy coincidence searching.

The present invention also provides a compression and decoding system which can compress, at high speed, integer character data which is to be preserved in the above-mentioned retrieval system, and is arranged in a monotonously increasing order (ascending order), and can reduce the required capacity of a memory used for storing compressed data.

Additionally, the present invention provides a variable-length data storage and reference system, which can decrease the data size of variable-length data to be preserved in the above-mentioned search system, and can increase the access speed.

The present invention provides a data base retrieval system which can shorten a time required for forming a list of search results and can decrease the required memory capacity of a memory device used in the above-mentioned retrieval system.

A data base retrieval system according to the present invention allows high-speed conditional searching regardless of the complexity of conditional expressions, and can re-utilize search results in the above-mentioned retrieval system.

A data base retrieval system according to the present invention provides a memory for storing vicinity feature values of records as search objects for the records. A searching device obtains matching degrees between a vicinity feature value of a search key and the vicinity feature values of the data records of the search object. Record numbers may be output by the searching device in descending order of the matching degrees.

According to the system of the present invention, phase information of data (position information indicating the position of a search key in a record) as a factor for prolonging the search time upon execution of full-record direct searching is abstracted by extracting vicinity feature values. The search time depends only on the length of search key information. Therefore, high-speed searching in which the search time does not depend on the data value can be performed. Since search results can be obtained as matching degrees (containing rates) of search keys in the records, a versatile search system can be realized independently of, e.g., syntax. In addition, fuzzy searching can be realized by referring to the matching degrees arranged in descending order. Text data, physical measurement data, signal waveform data, image data, acoustic data, and the like can be processed as a search object.

Upon compression and decoding of integer character data arranged in an ascending order, a divider divides the integer character data by a predetermined value. A quotient memory/comparison device compares a quotient obtained by the divider with a previously stored old quotient, and, when the obtained quotient is larger than the old quotient, provides an output corresponding to a difference between the new and old quotients. A memory stores a remainder obtained from the divider together with the difference between the two quotients when the difference is output from the quotient memory/comparison device. The memory stores only the remainder obtained from the divider when the quotient memory/comparison device does not output the difference between the two quotients (i.e., when the new and old quotients are equal). A decoder decodes original integer character data on the basis of the difference data between the two quotients and the remainder data stored in the memory.

According to the present invention, upon compression, data arranged in ascending order are divided, and the obtained quotient is compared with a previously obtained old quotient. The difference between the new and old quotients and the remainder are stored when a difference between the two quotients is detected. When no difference between the two quotients is detected, only the remainder data are stored. Therefore, since the amount of calculations can be greatly reduced compared to a conventional compression coding method, compression and decoding can be performed at high speed. Since no parameters such as statistical values associated with overall data are required, data can be easily added or deleted.

The system of the present invention provides a data memory for sequentially storing variable-length data, an ID assigning device for assigning an ID number to variable-length data stored in the data memory, and a storage location memory for storing a storage location of the variable length data in the data memory in correspondence with the ID number assigned by the ID assigning device.

According to the present invention, when data is stored, the ID number and storage location of the stored data are stored in the storage location memory. When data is to be accessed from the data memory, the storage location of the data is read out from the storage location memory to access the data. Therefore, since the data storage location can immediately be obtained from the storage location memory, the data memory can be accessed at a high speed. Since dummy data need not be added to the data to maintain data records having a fixed length, the volume of data to be stored can be reduced, and the required capacity of the storage medium can be decreased.

Furthermore, the data base retrieval system of the present invention for searching a data base in a fuzzy search mode provides a searching device for searching the data base using a search key to obtain matching degrees of the search key for all the records. A comparator compares the matching degrees of the search key of the records with a predetermined threshold value. A list preparing device prepares a list of records which are determined by the comparator to have matching degrees of the search key larger than the threshold value, and a record list memory stores the list of the records prepared by the list preparing device.

According to the present invention, when the data base is searched in a fuzzy search mode, the data base is searched using a search key to obtain matching degrees of the search key for all the records. The matching degrees of the search key of the data records are compared with the threshold value, and a list of search results of records, which have matching degrees of the search key larger than the predetermined threshold value, is formed, thus storing data.

Therefore, since the size of the list of the search results can be decreased, the capacity of the memory can be decreased and the search time can be shortened.

The data base retrieval system of the present invention provides a searching device for performing full-record searching under a predetermined condition, a search result memory for storing search results of the searching device, and a conditional searching device for performing conditional searching using the search results stored in the search result memory.

According to the present invention, when full-record searching is performed under a plurality of conditions, the searching device performs searching under a predetermined one of the plurality of conditions, and the search results are stored in the search result memory. The conditional searching device performs searching under complicated conditions using the search results. Therefore, since the search results based on the predetermined condition are stored, and searching under the complicated conditions are performed using the search results, partial search results can be re-utilized, and high-speed conditional searching can be realized.

BRIEF DESCRIPTION OF THE DRAWINGS

Other objects and advantages of the present invention will become apparent from the following description taken in conjunction with the accompanying drawings, wherein:

FIG. 4 is a view illustrating a vicinity feature value matrix;

DETAILED DESCRIPTION

Figure 1:
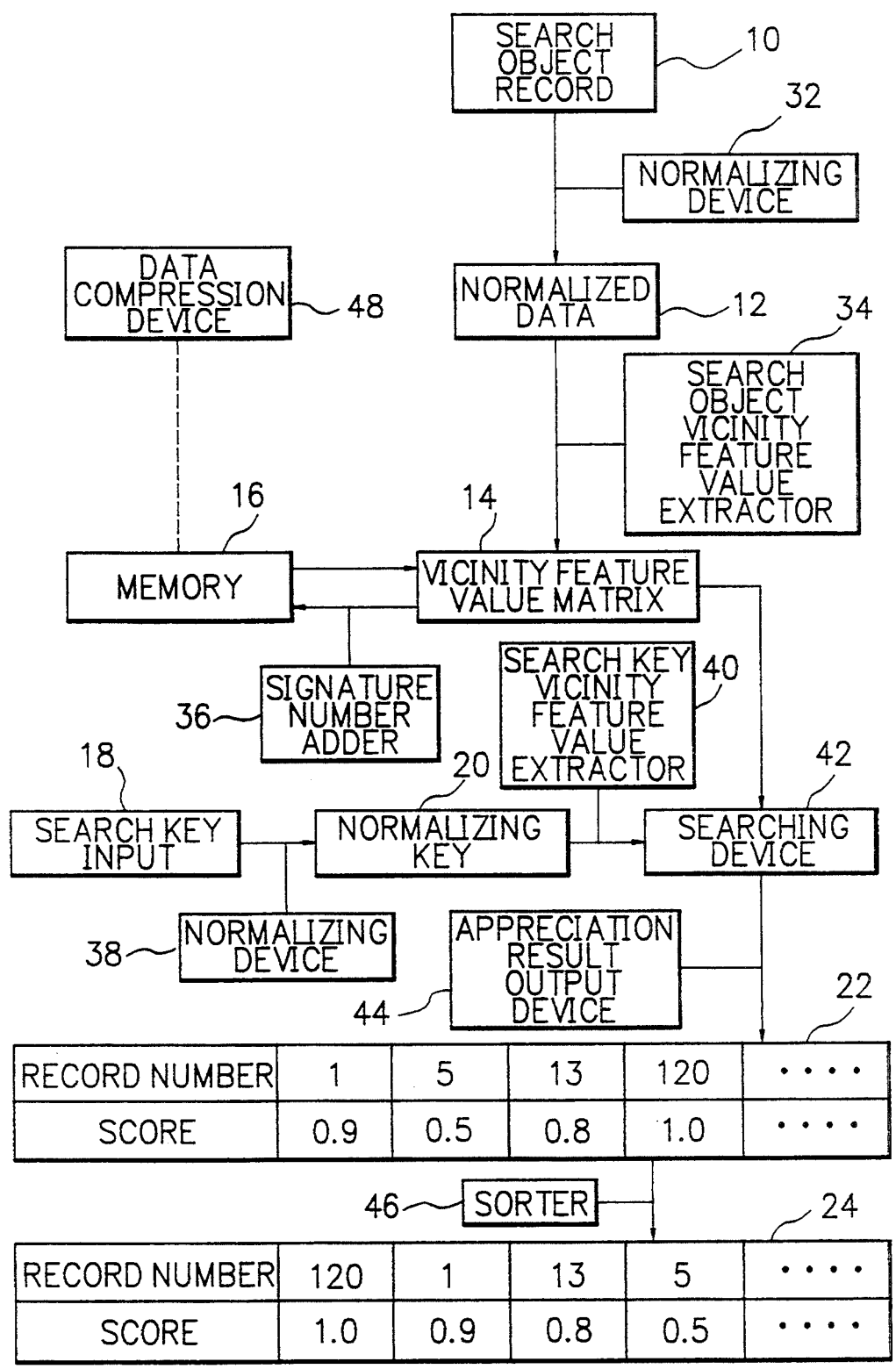
FIG. 1 is a block diagram illustrating a data base retrieval system according to the present invention.

FIG. 1 illustrates a pattern search system based on vicinity feature values according to the present invention. In this search system, vicinity feature value data obtained by abstracting all the phase information of events (information) from all the objective records are formed in advance, and full-record searching is performed for a group of the data. A searching algorithm consists of a studying step and a searching step. In the studying step, vicinity feature value matrices are formed as phase information of the data records. In the searching step, a matching calculation between a search key and the vicinity feature value matrix is performed, and appreciation results representing matching degrees (similarities) are obtained for the data records. The steps will be explained below.

(1) Studying Step

In FIG. 1, a search object 10 is text data in, e.g., Japanese, English, German, French, Hebrew, Russian, or the like, or is quantized waveform numerical value data, a chemical structural formula, gene information, or the like. Such a search object is normalized by a normalizing device 32. In general, a search object is expressed as a sequence of minimum information units (e.g., characters such as English letters in a text, real number values at a given time in a numerical value chart, or the like). The search object is converted into an n-gradation integer sequence. This processing is called data normalization.

For example, English text data can be converted into the following 256-gradation numerical value expression by directly using the ASCII code table.

| T | h | i | s |  | i | s |  | a |  | p | e | n | . |
|---|---|---|---|---|---|---|---|---|---|---|---|---|---|
| 84 | 104 | 105 | 115 | 32 | 105 | 115 | 32 | 97 | 32 | 112 | 101 | 110 | 46 |

In the codes described above, "T" corresponds to "84, "h" corresponds to "104", and so on.

Normalized data 12 is convoluted in the form of a vicinity feature value matrix 14 by a search object vicinity feature value extractor 34. In this case, various formulas for extracting vicinity feature values are proposed. The formula influences the sharpness of searching (lack of over-detection).

Figure 2:
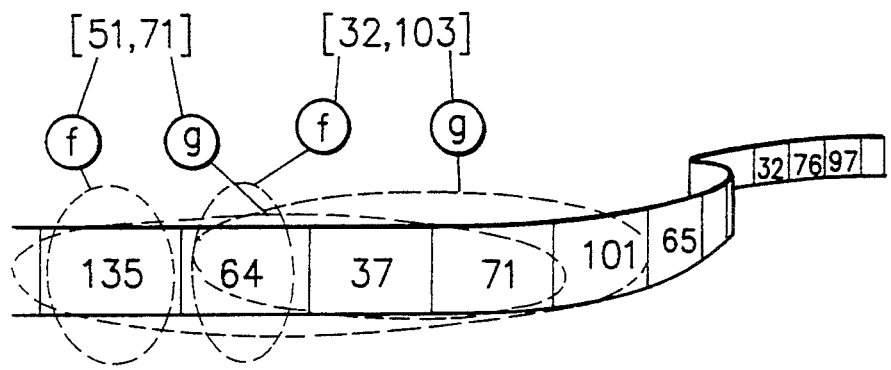
FIG. 2 is a view for explaining quantization of vicinity information according to the present invention.

Assume that a j-th data character of an i-th record of the text is represented by $C_{i,j}$. A quantization value x associated with $C_{i,j}$, and a quantization value y associated with k data characters in the vicinity of $C_{i,j}$ are obtained as follows. In this case, assume that there are n objective records, and quantization of the i-th record will be explained below. If a row of normalized numerical values 135, 64, 37, 71 101, ... is aligned in the i-th record, as shown in FIG. 2, the quantization value x associated with $C_{i,j}$ is given by:

$$x = f(C_{i,j}) \qquad (1)$$

The quantization value y associated with the k data characters in the vicinity of $C_{i,j}$, is given by:

$$y = g(C_{i,j}, C_{i,j+2}, \ldots, C_{i,j+k}) \qquad (2)$$

The function $f(C_{i,j})$ is the n-stage quantization function associated with $C_{i,j}$. More specifically, $f(C_{i,j})$ is a value obtained by performing a predetermined calculation for the j-th data character $C_{i,j}$ of the i-th record, and is expressed by an integer within a range between 1 and n. Therefore, a position in the x-direction in a matrix (coordinates) shown in FIG. 3 is determined within the range between 1 and n according to the obtained value x.

The function $g(C_{i,j}, C_{i,j+1}, C_{i,j+2}, \ldots, C_{i,j+k})$ is the m-stage quantization function associated with the k data characters in the vicinity prior to $C_{i,j}$. More specifically, $g(C_{i,j}, C_{i,j+1}, C_{i,j+2}, \ldots, C_{i,j+k})$ is a value obtained by performing a predetermined calculation for the j-th data character $C_{i,j}$ of the i-th record and a predetermined number of data in the vicinity of the data character $C_{i,j}$, and is expressed by an integer within a range between 1 and m. For example, as shown in FIG. 2, when the j-th data character $C_{i,j}=135$ and k=3, data information 64, 37, and 71 following the data 135 is extracted as $C_{i,j+1}$, $C_{i,j+2}$, and $C_{i,j+3}$, and a predetermined calculation is performed for a correlation among these data and the data 135. When the j-th data character $C_{i,j}$ is the next data 64, data 37, 71, 101 following the data 64 is extracted as $C_{i,j+1}$, $C_{i,j+2}$, and $C_{i,j+3}$, and a predetermined calculation is performed for a correlation among these data and the data 64.

Figure 3:
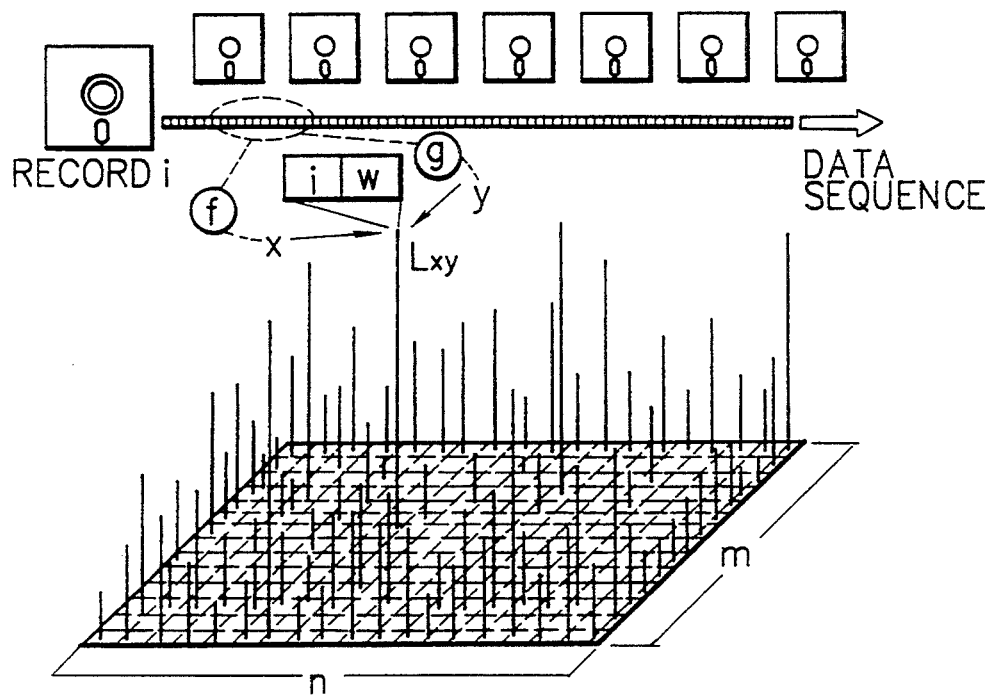
FIG. 3 is a view illustrating an information structure to be stored according to the present invention.

A position in the y-direction in the matrix (coordinates) shown in FIG. 3 is obtained within the range between 1 and m according to the value y obtained in this manner. Therefore, when x and y are obtained as described above, the position on the matrix (coordinates) shown in FIG. 2 can be determined.

In this system, each information record is stored as a set of a serial number i and a significance w(x,y,i) with respect to x and y obtained as described above. The significance w(x,y,i) is obtained by a predetermined calculation of data x, y, and i. In general, the value of the significance w(x,y,i) may be fixed to 1.

Data is stored in units of data $C_{i,j}$ obtained as described above on the basis of the values x and y, as indicated by bars in FIG. 3. More specifically, data as a set of the serial number i of a record and its significance w(x,y,i) is stored at the coordinate position defined by the values x and y of the data character $C_{i,j}$. In FIG. 3, the length of each bar is increased every time such data is stored. If the significance w(x,y,i) is set to be 1, only data of the serial number i of a record is stored at the coordinate position defined by the values x and y.

In place of the above-mentioned matrix (x,y), a matrix (x,y) given by the following equation may be used.

$$(x,y) = (f(c_i), g(c_i c_{i+j})) \quad (3)$$

where f( ) and g( ) are arbitrary integer functions. In this case, the domain of variability of $c_i$ is equal to the ranges of f( ) and g( ).

Figure 4:
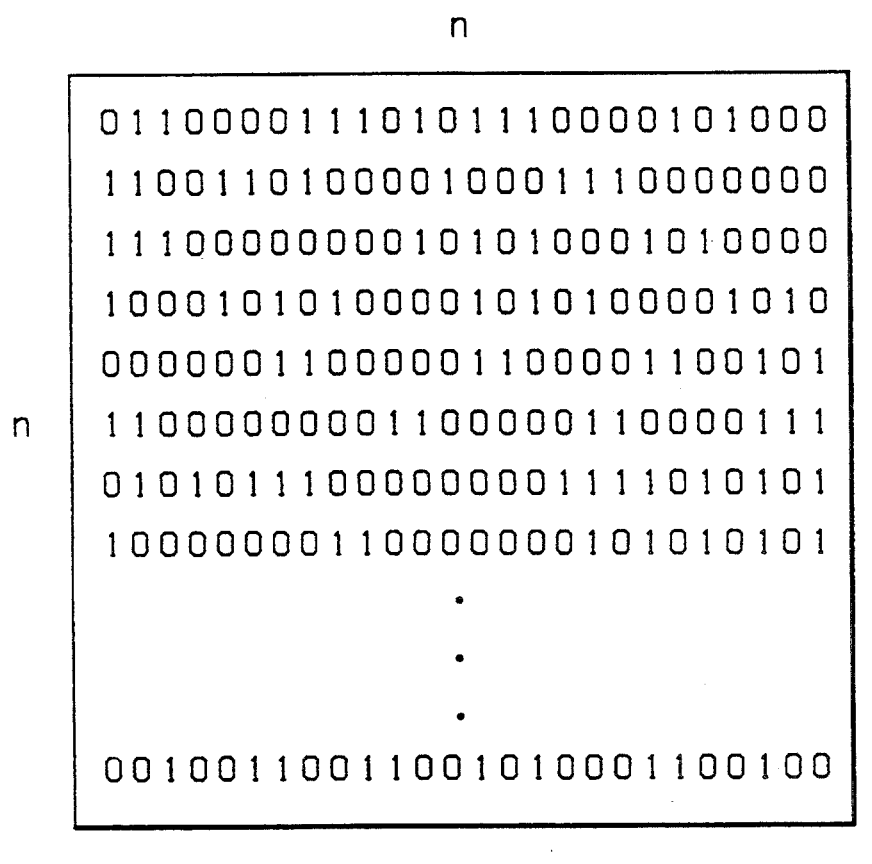

More specifically, if an i-th integer value in a record is represented by $c_i$, a calculation for setting an element value of the matrix given by equation (3) is repeated for j, and this processing is performed for all i's. Thus, the structural information of each record is convoluted into an n-th-order square matrix, as shown in FIG. 4. In this case, since each matrix element has only two values, the matrix can be sufficiently expressed by an n-th-order bit matrix, in practice. In this case of English text data in the above-mentioned 256-gradation numerical value expression, a vicinity feature value matrix is defined by 256×256.

The following calculation method will be exemplified for the above-mentioned English text data. In equation (3), if
f: x→x
g: (x, y)→y
j=1,2 then, as for the first character "T" of "This", neighboring (j=1) and next neighboring (j=2) correlations (T→h) and (T→i) are respectively convoluted by two values, and 1 is set at a bit corresponding to an element given by:

$$(x,y) = (84,104), (84,105)$$

This operation is performed for the respective characters. At the end point of the above-mentioned record, only information relating to one vicinity character is convoluted (n→.).

A signature number of a record is added to the vicinity feature value matrix formed in this manner by a signature number adder 36, and the matrix is stored as a structure file in a memory 16.

(2) Searching Step

A search key is input from a search key input device 18. For example, "This is a pen." is used as a search key. Key information of the search key is normalized to an integer character by a normalizing device 38 based on the same normalizing method as that in the studying step, thus obtaining a normalizing key 20.

84|104|105 ↑ 115|32|105|115|32|97|32|112|101|1-10|46|

Then, a search key vicinity feature value extractor 40 forms a series of sets of x and y from the beginning of the normalized numerical value character corresponding to each record using the same vicinity feature value extraction formulas f( ) and g( ). Based on the series of sets of x and y, a searching device 42 calculates a containing rate $w_k$ of the search key with respect to a record k by totaling $V(x_j, y_j, k)$ for j=1 to m.

In this case, when a record information list has a significance for a record i, $V(x_j, y_j, k)$ is determined to be equal to the significance; otherwise, $V(x_j, y_j, k)$ is determined to be 0.

Therefore, when data (i.e., bar) is present at the position (x,y) in FIG. 3 corresponding to the sets of x and y of the numerical value character to be searched, its significance value is stored at a storage location of the serial number i of a record indicated by the data on a separately arranged memory.

Note that a search key may be applied to the vicinity feature value matrix corresponding to each record by the following equation (4) to perform structural appreciation of search key information.

$$\text{score} = \Sigma \Sigma p(f(c_i), g(c_i c_{i+j})) \quad (4)$$

(where the appreciation function p(x,y) assumes 1 when (x,y) in the matrix is non-zero, and assumes 0 when it is zero.)

More specifically, if a matrix element of each record corresponding to neighboring (j=1) and next neighboring (j=2) vicinity feature values for a character (i=1) of interest of a search key is 1, 1 is accumulated, and this processing is repeated for i characters in the search key. Equation (4) can be executed at very high speed by a logical calculation of AND, OR, addition and the like.

An appreciation result output device 44 divides a structural appreciation values "score" (matching degrees) obtained for the data records with an appreciation value (the number of characters in the search key information—k or twice the number of characters) upon complete coincidence so as to obtain containing probabilities of the search key, thus obtaining a list 22 of appreciation results. Furthermore, a sorter 46 sorts the list 22 in descending order of the containing probabilities to obtain a sorted list 24.

The sorted list 24 corresponds to the search result. With reference to upper records in the list, names of records including the search key and having high probabilities can be detected. Since the containing probabilities can be detected. Since the containing probabilities can be obtained from all the complete and incomplete coincidence data, fuzzy coincidence searching can be performed.

If the search key is present in a given record in a given document in a complete coincidence state, p( ) in equation (4) becomes 1 for all the i's and j's.

Since full-record searching is performed for all the pieces of information of the search key, the probability of search omission can be substantially zero.

The appreciation time of the search key for one record depends only on the number of characters in the key, and does not depend on the size of the record. Therefore, searching can be performed at very high speed.

When a logical calculation is performed between the search result lists, search calculation processing such as AND, OR, and the like for search conditions can be executed at high speed.

The vicinity feature value extraction formula given by equation (3) can be variously modified. For example, if f: x→x g: (x,y)→x−y (or |x−y|)

then a vicinity feature value matrix can be formed using the difference between neighboring and next neighboring characters (or the absolute value of the difference) as correlation information. Alternatively, individual character integer values of some character strings may be subjected to four-rule calculations to extract vicinity feature values.

The vicinity feature values need not always be extracted from all the data of the records. For example, vicinity feature values may be generated by excluding a specific one or more integer values in record data, integer values within a specific range, or a specific one or more bits in bytes constituting a data character. When a record is constituted by two-byte characters like a Japanese text, vicinity feature values may be extracted from, e.g., lower bytes while excluding upper bytes.

In the above-mentioned case, a matrix generated by the vicinity feature values is a 256th-order bit matrix, and this matrix corresponds to 8 kbytes. Therefore, in a data base in which each record has about 1 kbyte of data, the above-mentioned system is not an efficient system. Thus, data compression is performed by a data compression device 48 to decrease the necessary capacity of the memory 16.

Figure 5:
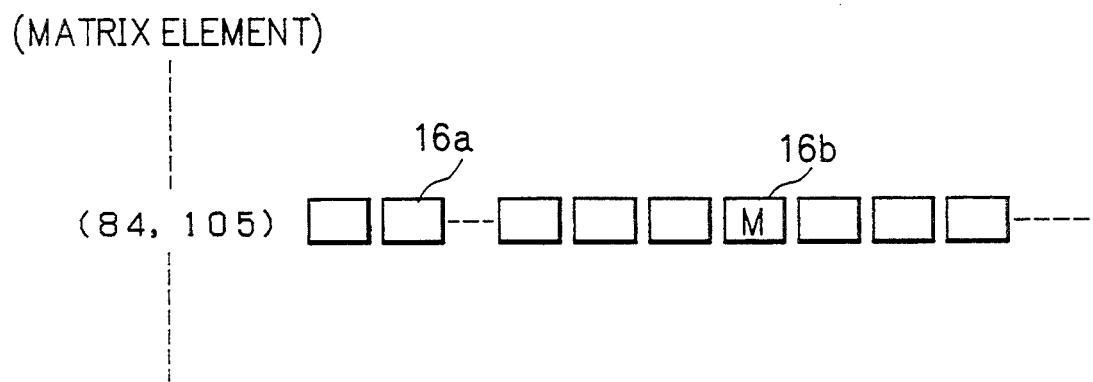
FIG. 5 is a view illustrating the data architecture of a compressed vicinity feature value.

FIG. 5 shows an example of a data compression method. In this example, record names 16a (signature codes) each having an element value=1 are accumulated as a data row of 1 byte/records in units of elements of the 256th-order vicinity feature value matrix. Therefore, a record name having an element value=0 is excluded as unnecessary data.

When the number of records exceeds 255, since the record name 16a cannot be expressed by one byte, only the lower one byte is accumulated. For example, when the number of records is 10,000, each record name is expressed by two bytes, and the lower byte of the two bytes is used. Every time a record name code exceeds 255, a marker 16b is inserted in a data row.

Upon searching, data rows of the structure files corresponding to the vicinity feature values of a search key are extracted, and an appearance frequency table divided into units of record names is formed. In this case, every time the marker 16b appears, 255 is added to the record name code. On the basis of the appearance frequency table formed in this manner, the appreciation result list 22 shown in FIG. 1 is obtained.

When the data sequence of a given record name code exceeds half of all the records, it is determined that the vicinity feature value matrix element is common to the respective records, and the element may be excluded.

In the above embodiment, the normalizing device 32, the search object vicinity feature value extractor the signature number adder 36, the normalizing device 38, the searching device 42, the appreciation result output device 44, the sorter 46, and the data compression device 48 may be implemented by a computer program, but may also be implemented as a special-purpose hardware arrangement using logical circuit elements.

Figure 6:
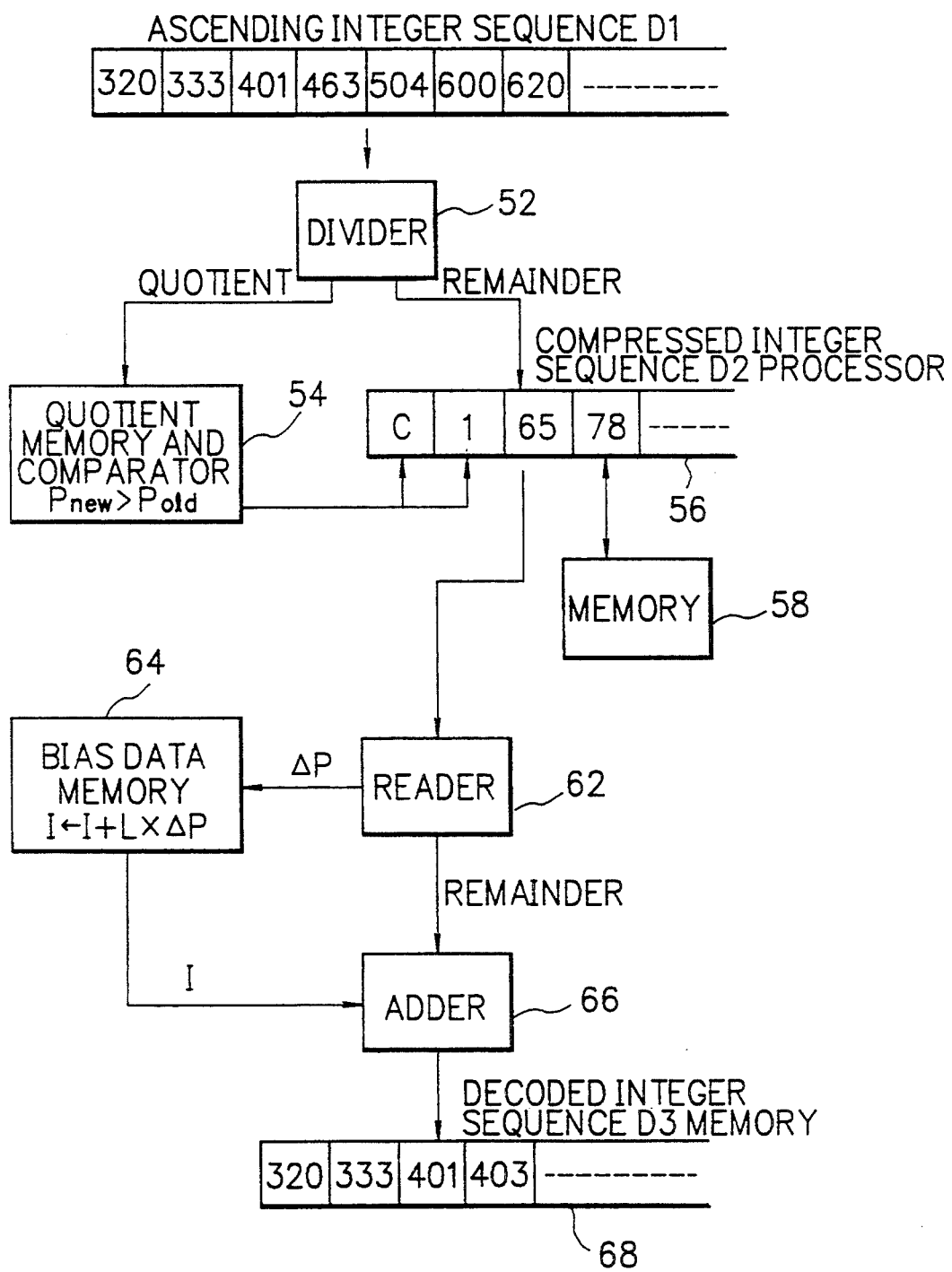
FIG. 6 is a block diagram illustrating a compression and decoding system according to the present invention.

FIG. 6 shows an embodiment of a compression and decoding system according to the present invention. As shown in FIG. 6, integer character sequence data D1 is arranged in a monotonously increasing order (ascending order) such as "320, 333, 401, . . . ". Each of these data elements is expressed by, e.g., 32 bits. The integer character sequence data D1 is supplied to a divider 52 in a compression apparatus. The divider 52 divides the input data by a predetermined value. In this embodiment, input data is divided by 255. The obtained quotient is supplied to a quotient memory and comparator 54, and the remainder is supplied to a compressed integer sequence D2 processor 56.

The quotient memory and comparator 54 compares a new quotient $P_{new}$ received from divider 52 with a stored old quotient $P_{old}$. The initial value of the old quotient $P_{old}$ is 0. When $P_{new} > P_{old}$ the quotient memory and comparator 54 supplies a mark character C indicating carry and the difference ($P_{new} - P_{old}$) between the two quotients to the compressed integer sequence D2 processor 56, and stores the new quotient $P_{new}$ in place of the stored old quotient $P_{old}$. When this condition is not satisfied, the quotient memory and comparator 54 supplies no data to the compressed integer sequence D2 processor 56.

In this embodiment, when the first data element "320" is divided by 255, a quotient=1 and a remainder =65 are obtained. Since the initial value of the old quotient $P_{old}$ is 0, $P_{new} > P_{old}$ is satisfied, and the quotient memory and comparator 54 supplies the mark character C indicating a carry and the difference "1" between the quotients to the compressed integer sequence D2 processor 56, and stores the new quotient "1" in place of the stored old quotient "0".

The compressed integer sequence D2 processor 56 stores the mark character C indicating a carry and the difference "1" between the quotients supplied from the quotient memory and comparator 54, and the remainder "65" supplied from the divider 52.

When "333" is supplied as the integer sequence character data D1, the divider 52 divides it by 255. In this case, the quotient =1 and the remainder=78. The quotient memory and comparator 54 compares the new quotient $P_{new}$ with the previously stored old quotient $P_{old}$. In this case, since both $P_{new}$ and $P_{old}$ are "1". The above-mentioned condition $P_{new} > P_{old}$ is not satisfied. Therefore, only the remainder data is supplied from the divider 52 to the compressed integer sequence D2 processor 56.

When the above-mentioned operation is repeated, compressed data is sequentially supplied to the compressed integer sequence D2 processor 56. The compressed data is stored in a memory 58.

In decoding, the compressed data stored in the memory 58 is fetched by the compressed integer sequence D2 processor 56, and is read by a reader 62. When the mark character C indicating a carry appears in the compressed data, the reader 62 supplies data immediately after the mark character C to a bias data memory 64. The reader 62 supplies remainder data to an adder 66 independently of the presence/absence of appearance of the mark character C.

Since the first compressed data in this embodiment contains a mark character C indicating a carry, the immediately following data "1" is supplied to the bias data memory 64. The remainder data "65" is supplied to the adder 66.

The bias data memory 64 stores a value I based on the quotient, as shown in FIG. 6. Memory 64 receives from reader 62 data ΔP (i.e., the difference between the two quotients) immediately after the mark character C. Memory 64 adds a product L×ΔP (where L is a divisor and ΔP is the difference of the new and old quotients) to the stored value I, and stores the sum as a new value I. Bias data memory 64 outputs the new I value to the adder 66. The initial value of I is 0.

In this embodiment, as described above, the divisor L is 255 and a "1" is supplied as the data ΔP immediately after the mark character C. Therefore, bias data memory 64 stores a value of "255" obtained by adding 255×1 to the initial value "0" of I, and provides it to the adder 66.

The adder 66 adds I supplied from the bias data memory 64 to the remainder supplied from the reader 62° In this case, the adder 66 adds "255" supplied from the bias data memory 64 and the remainder data "65" supplied from the reader 62, thereby obtaining decoded data "320". The obtained decoded data is stored in a decoded integer character sequence D3 memory 68, and is output as needed.

According to this embodiment, in the compression mode, ascending data is divided by the divisor L, and the obtained quotient is compared with a previously stored old quotient. When there is a difference between the old and new quotients, the difference and the remainder are stored. When there is no difference between the old and new quotients, only the remainder data is stored. Therefore, since the calculation amount can be greatly reduced as compared to a conventional compression coding method, compression and decoding can be performed at high speed. Since no parameters such as statistical values associated with overall data are required, data can be easily added or deleted.

This compression and coding system can be applied to data processing in the above-mentioned data retrieval system.

Figure 7:
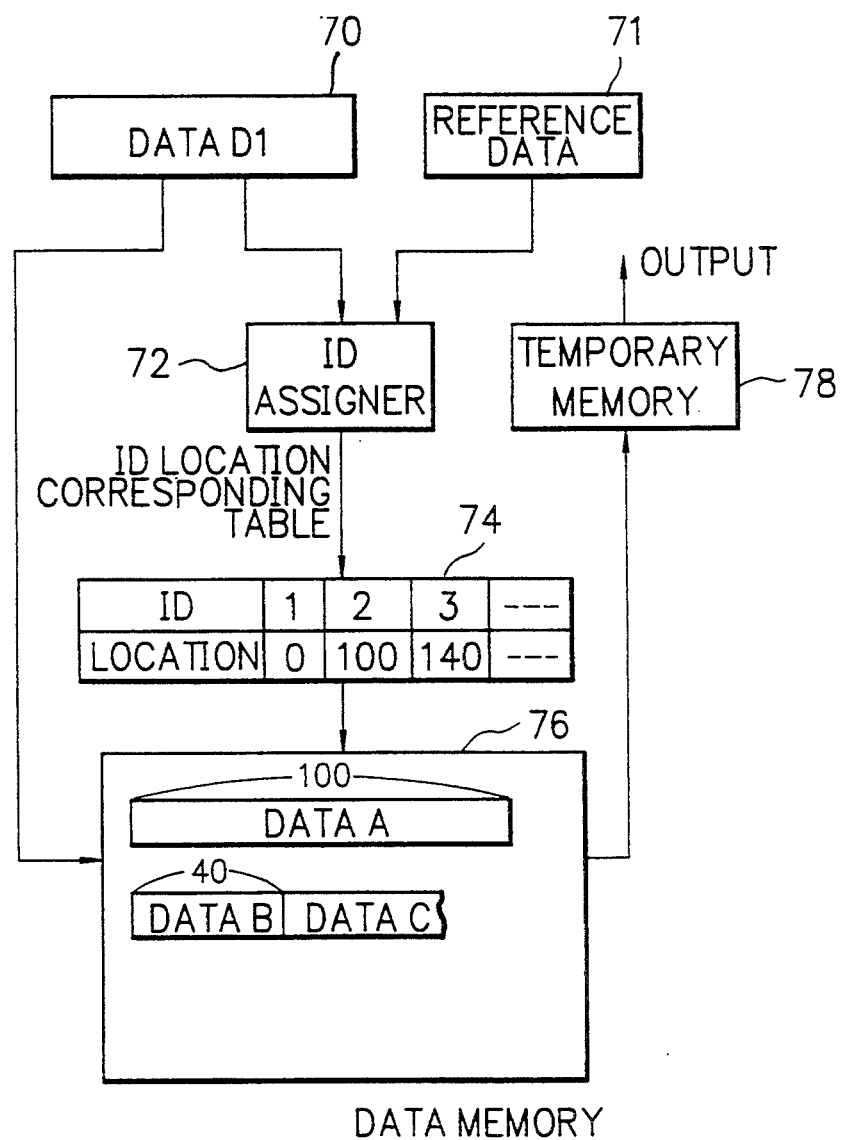
FIG. 7 is a block diagram illustrating a variable-length data storage and reference system according to the present invention.

FIG. 7 illustrates an embodiment of a variable-length data storage and reference system according to the present invention. As illustrated in FIG. 7, when variable-length data is stored, data D1 is stored in a data memory 76 of a storage medium in the order of data A, data B, and data C. In the case shown in FIG. 7, the lengths of data A and B are respectively 100 and 40. Therefore, as shown in an ID location corresponding table 74, data A is stored at a storage location "0", data B is stored at a storage location "100" and data C is stored at a storage location "140". These locations are stored in the ID location corresponding table 74°

The data D1 is also supplied to an ID assigner 72, and is assigned with data serial numbers (IDs). The data serial numbers (IDs) are serial numbers assigned in correspondence with data, as shown in the ID location corresponding table 74. In this case, IDs "1", "2", and "3" are respectively assigned to the data A, B, and C. The assigned data IDs are supplied to and stored in the ID location corresponding table 74.

In this manner, data D1 is stored in the data memory 76 and the data IDs and corresponding data storage locations are stored in the ID location corresponding table 74.

When variable-length data 70 is referred to (or read out), data 71 corresponding to a reference request or its ID is supplied to the ID assigner 72, and the ID assigner 72 outputs the ID of this data. The data ID is supplied to the ID location corresponding table 74, and the table 74 outputs the corresponding storage location. Data is read out from the data memory 76 on the basis of the output storage location, and is stored in a temporary data memory 78. The data stored in the temporary data memory 78 is output to an output device (not shown) such as a CRT according to a request from an operator.

The ID assigner 72 and the temporary data memory 78 comprise storage media, which can be accessed at high speeds, and the ID location corresponding table 74 and the data memory 76 comprise storage media, which can be accessed at low speeds. Therefore, since the data memory 76 for storing data is an inexpensive storage medium which can be accessed at low speed, the capacity of the data memory 76 can be sufficiently large. Since the ID assigner 72 and the data temporary memory 78 are storage media which can be accessed at high speed, ID assignment upon data storage and reference of data read out from the data memory 76 and stored in the temporary data memory 78 can be performed at high speed.

According to this system, as described above, when variable-length data is stored, the data D1 is stored in the data memory 76, and the IDs assigned to the respective data, and the storage locations of data are stored in the ID location corresponding table 74. When data is referred to (or read out), data corresponding to a reference request is supplied to the ID assigner 72, and the ID assigner 72 outputs the ID of this data. The output ID is supplied to the ID location corresponding table 74. The table 74 outputs the storage location corresponding to the ID, and data is read out from the data memory 76 on the basis of the output storage location.

Therefore, since the data storage location is accessed using correspondence between the data ID and the data storage location stored in the ID location corresponding table 74, an access position to a record can immediately be obtained, and a data read (search) access can be performed at high speed.

When data is stored, it is not necessary to maintain constant record sizes or to add dummy data to the data records. Thus, it is possible to prevent the volume of data to be stored from being increased.

This variable-length data storage and reference system can be applied to storage and reference operations of data in the above-mentioned data retrieval system.

Figure 8:
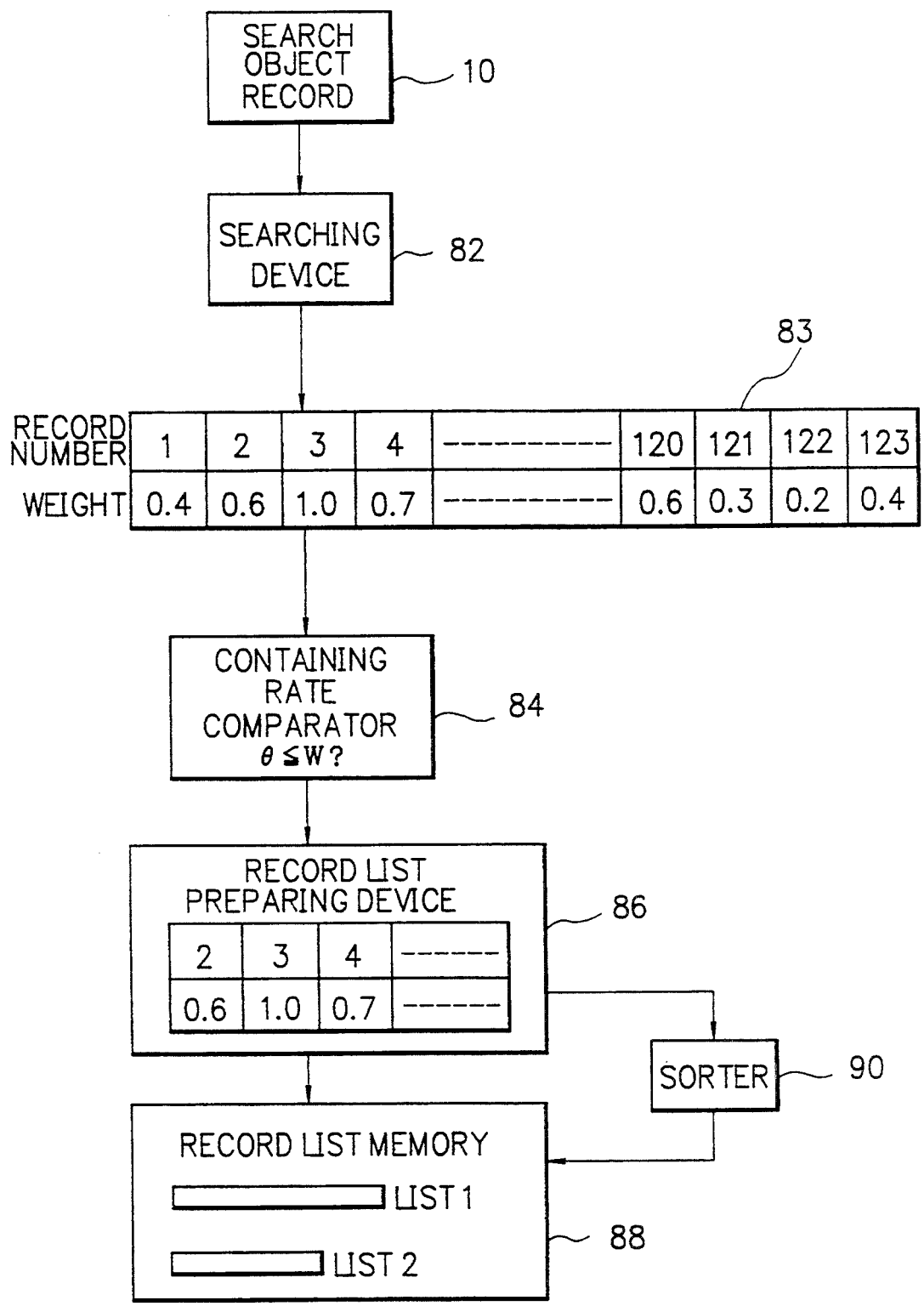
FIG. 8 is a block diagram illustrating a data base retrieval system according to the present invention.

FIG. 8 illustrates another embodiment of a system according to the present invention. As shown in FIG. 8, this system includes a searching device 82. Searching device 82 performs full-record searching of a search object 10 as a data base using a conditional expression consisting of a predetermined search key input from a search key input device (not shown).

The search result 83 obtained by the searching device 82 consists of a record number and a significance (weight) of the record, i.e., a containing rate (matching degree) of a search key for the record, as shown in FIG. 8. In FIG. 8, since the significance data (containing rates) of records 1, 2, and 3 are respectively 0.4, 0.6, and 1.0, record 3 has the highest containing rate (matching degree) of the three records.

The search results 83 obtained by the searching device 82 are supplied to a containing rate comparator 4. The containing rate comparator 84 compares a significance W of each record supplied from the searching device 82 with a threshold value $\theta$ input from a threshold value input device (not shown) to check if $\theta \leq W$. If $\theta \leq W$ is satisfied, i.e., when the significance W of a record is equal to or larger than the threshold value $\theta$, the record and its significance data W are supplied to a record list preparing device 86, and are used as data for preparing a record number list.

When $\theta \leq W$ is not satisfied, i.e., when the significance W of a record is smaller than the threshold value $\theta$, the above-mentioned data is not used as data for preparing the record number list, and is not supplied to the record list preparing device 86.

The record list preparing device 86 prepares the record number list with containing rates of the search key using data supplied from the containing rate comparator 84 (i.e., the numbers of records whose significance data W are equal to or larger than the threshold value $\theta$) and the significance data W. This list is constituted by the record numbers and significance data, as illustrated in FIG. 8.

The record number list data prepared by the record list preparing device 86 is supplied to a record list memory 88. The record list memory 88 stores the record lists prepared by the record list preparing device 86 such as list 1, list 2, . . . .

According to this system, for data consisting of a record number and significance data of the record, i.e., a containing rate (matching degree) of a search key for the record, the significance data W is compared with a threshold value $\theta$, and a record number list is prepared using only data of records whose significance data W is equal to or larger than the threshold value $\theta$. The list is stored in record list memory 88.

Therefore, since the size of the prepared record number list can be small, the list preparation time can be shortened, and search work efficiency can be improved. Since the list to be stored can be decreased in size, the required capacity of a memory 88 which stores the lists can be decreased.

The record number list prepared by the record list preparing device 86 may be supplied to a sorter 90, and after the list is sorted in the order of significance data W, the sorted list may be stored in the record list memory 88. Alternatively, data 83 output from the searching device 82 may be supplied to the sorter 90, and after the data is sorted in the order of significance data W, the sorted data may be supplied to the containing rate comparator 84.

As will be described later, when data output from the searching device 82 has already been sorted in the descending order of significance data W, if the significance data W becomes smaller than $\theta$ upon comparison with the threshold value in the containing rate comparator 84, the subsequent comparison can be omitted.

This search system can be applied to processing of the search result in the above-mentioned data search system.

Figure 9:
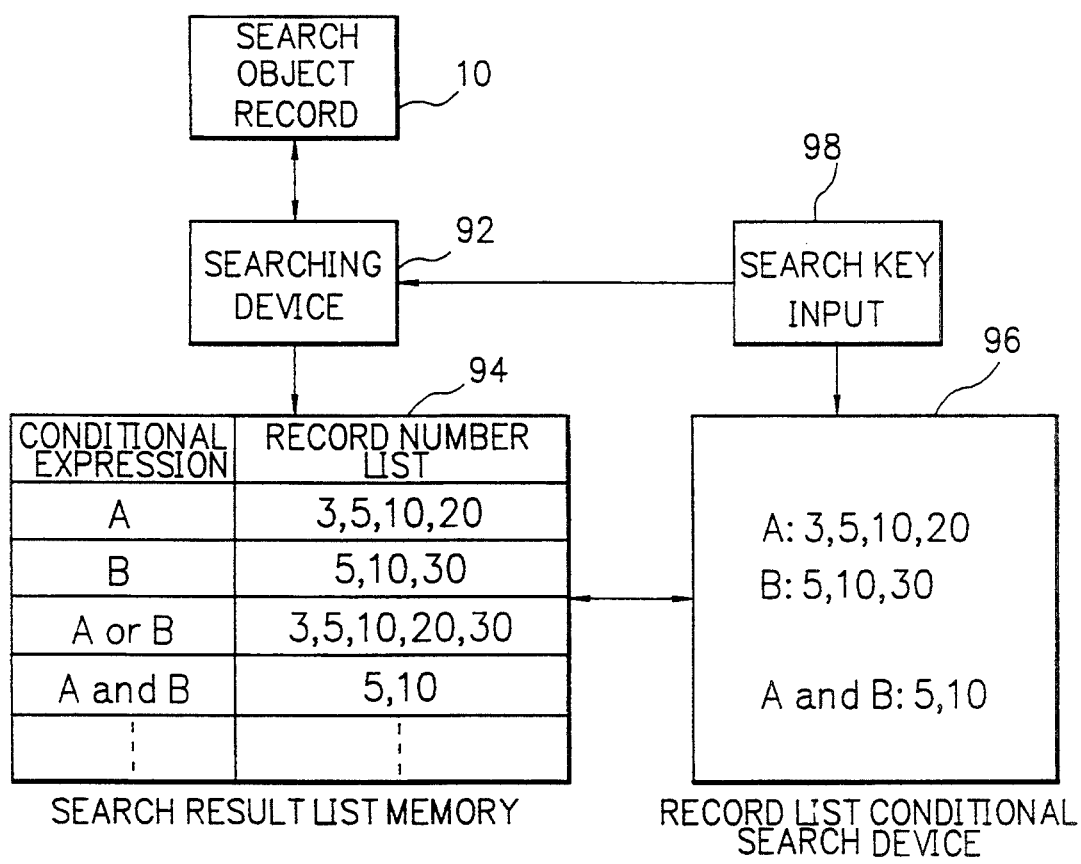
FIG. 9 is a block diagram illustrating a data base retrieval system according to the present invention.

FIG. 9 illustrates an embodiment of a system according to the present invention. As shown in FIG. 9, this system has a searching device 92, a search result list memory 94, and a record list conditional search device 96. The searching device 92 performs full-record searching of a search object 10 as a data base using a condition expression consisting of a predetermined search key input from a search key input device 98.

For example, when keys input from the search key input device 98 are A and B, as shown in FIG. 9, the searching device 92 performs searching using the conditional expressions A and B, and search results are stored in the search result list memory 94. In FIG. 9, the record number list (3, 5, 10, 20) is searched by the conditional expression A, and the record number list (5, 10, 30) is searched by the conditional expression B. These record number lists are stored in the search result list memory 94 as search results.

The record list conditional search device 96 performs searching using a further complicated conditional expression based on the results stored in the search result list memory 94. For example, when searching using a conditional expression (A or B) or (A and B) is performed using the search results obtained by the conditional expressions A and B, the record list conditional search device 96 reads out the search results obtained by the conditional expressions A and B from the search result list memory 94, and performs searching based on the conditional expression (A or B) or (A and B) using the search results read from the search result list memory 94.

In this embodiment, since the results sorted in the search result list memory 94 are the record number list (3, 5, 10, 20) searched by the conditional expression A, and the record number list (5, 10, 30) searched by the conditional expression B, as described above, when searching using the conditional expression (A or B) is performed, these record number lists are logically ORed to obtain a record number list (3, 5, 10, 20, 30). Similarly, when searching using the conditional expression (A and B) is performed, these record number lists are logically ANDed to obtain a record number list (5, 10). The obtained record number lists are stored in the search result list memory 94.

Therefore, by using these lists, the record list conditional search device 96 can similarly perform searching using, e.g., a conditional expression "(A or B or C)" or "((A or B or C) and E)".

According to this embodiment, the search results obtained by conditional expression consisting of predetermined search keys are stored in the search result list memory 94 as record number lists. When searching using a complicated conditional expression as a combination of the keys is performed, the conditional searching is performed using the stored record number lists.

Therefore, searching using a complicated conditional expression need not be performed for all the records. Therefore, the search time can be shortened. In addition, since searching is performed by re-utilizing partial conditional search results, search efficiency can be improved.

This search system can be applied to searching of conditional expressions in the above-mentioned data retrieval system.

The data base retrieval system of the present invention stores vicinity feature values of records as search objects in the data records, obtains matching degrees between a vicinity feature value of a search key and the vicinity feature values of the search objects for the records, and outputs record numbers in descending order of matching degrees.

Therefore, according to the present invention, since phase information of data (position information indicating the position of a search key in a record) as a factor for increasing the search time upon execution of full-record direct searching is abstracted by extracting vicinity feature values, the search time depends only on the length of search key information. Therefore, high-speed searching in which the search time does not depend on the data volume can be realized. Since search results are obtained as the matching degrees (containing probabilities) of a search key in units of records, a versatile retrieval system independent from, e.g., syntax can be realized. Since incomplete coincidence searching can be performed by referring to the matching degree in the descending order, fuzzy searching can be attained, and the system of the present invention is strong against noise on the search key.

What is claimed is:

1. A method for retrieving information from data records of a search object of a data base in response to an input search key, the method comprising the steps of:

storing vicinity feature values of the data records, said vicinity feature values indicating a correspondence between data characters of the data records;

obtaining matching degrees for the data records indicating a degree of correspondence between the stored vicinity feature values of the data records and a vicinity feature value of the search key, the vicinity feature value of the search key indicating a correspondence between data characters of the search key; and providing as search results of the information retrieving method data record numbers and corresponding matching degrees for the data records.

2. A method according to claim 1, wherein said data record numbers and corresponding matching degrees are provided in a descending numerical order of said matching degrees.

3. A method according to claim 1, further comprising the step of extracting the vicinity feature values of the data records from the search object by a convolution calculation among data characters of the search object.

4. A method according to claim 1, further comprising the step of extracting the vicinity feature value of the search key by a convolution calculation among data characters of the search key.

5. A method according to claim 1, wherein the vicinity feature values of the data records are calculated in a similar manner as the vicinity feature value of the search key.

6. A method according to claim 1, wherein a quantization value x associated with a j-th data character $C_{i,j}$ in an i-th data record of the search object, and a quantization value y associated with k data characters $C_{i,j+1}$, $C_{i,j+2}$, ... $C_{i,j+k}$ in the vicinity of the data character $C_{i,j}$ are obtained by:

$$x = f(c_{i,j})$$
$$y = g(C_{i,j}, C_{i,j+1}, C_{i,j+2}, \ldots C_{i,j+k})$$

wherein f(A) and g(B) are functions of A and B, respectively, wherein i,j and k are integers, and wherein a data record number i and a significance w(x,y,i) of the data record are stored for each data record as said vicinity feature values in a memory location defined by the obtained values x and y.

7. A method according to claim 6, wherein the significance w(x,y, i) is 1.

8. A method according to claim 6, wherein the quantization value x is expressed by one of n-stage values.

9. A method according to claim 1, wherein quantization values $x = f(c_i)$ and $y = g(c_i, c_{i+j})$ are given to i-th data character $c_i$ of a data sequence of the search object, and data $c_{i+j}$ (j=1, 2, ...) in the vicinity of the data character $c_i$, the quantization values are used as element numbers of a matrix, one element value (=1) of two values (1, 0) is given to the element numbers, and a bit matrix generated for all i's is used as the vicinity feature values.

10. A method according to claim 9, wherein the quantization values $x = f(c_i)$ and $y = g(c_i, c_{i+j})$ are given to i-th data character $c_i$ of a data sequence of the search object, and data $c_{i+j}$ (j=1, 2, ...) in the vicinity of the data character $c_i$, an element value of the corresponding element number of the bit matrix is checked using the quantization values as the element numbers of the matrix, when the element value is 1, +1 is counted as the matching degree, and the matching degrees for all i's are obtained in units of records.

11. A method according to claim 1, further comprising the step of converting data characters of the search object and the search key into integer data characters in which each data character is n-gradation data.

12. A method according to claim 11, wherein n=256.

13. A method according to claim 11, further comprising the steps of:

dividing said integer data characters by a predetermined value, said integer data characters being arranged in an ascending order of value;

comparing a new quotient obtained by said dividing means with a previously stored old quotient;

when the new quotient is larger than the old quotient, providing a difference between the new and old quotients and storing a remainder obtained by said dividing step together with the difference between the new and old quotients;

when the new quotient is not larger than the old quotient, storing only the remainder obtained by said dividing step; and decoding original integer character data on the basis of the stored difference data and remainder data.

14. A method according to claim 13, further comprising the step of storing the difference between the new and old quotients together with a mark indicating a carry when the new quotient is larger than the old quotient.

15. A method according to claim 6, further comprising the steps of:

sequentially storing in a variable-length data memory means variable-length data corresponding to data records of said search object;

assigning identification numbers to the stored variable-length data;

storing in a storage location memory means the assigned identification numbers in correspondence with storage locations of the variable-length data stored in said variable-length memory means; and when data is to be read from said variable-length memory means, reading the storage location of the data from said storage location memory means to access said variable-length data memory means.

16. A method according to claim 15, further comprising the step of temporarily storing data read from said variable-length data memory means.

17. A method according to claim 6, further comprising the steps of:

searching a data base using the search key to obtain matching degrees between the search key and each of the data records;

comparing the matching degrees obtained by the data base searching step for each of the data records with a predetermined threshold value;

preparing a list of data records which are determined by said comparing step to have matching degrees larger than the threshold value; and storing as search results the list of data records prepared by said list preparing step.

18. A method according to claim 17, further comprising the step of sorting the data records in a descending numerical order of the matching degrees.

19. A method according to claim 6, further comprising the steps of:
- performing full-record searching under predetermined conditions;
- storing search results of said full-record searching step; and
- performing conditional searching using the search results stored in said search result storing step.

20. A data base retrieval system for retrieving information from data records of a search object of a data base in response to an input search key, said system comprising:
- first means for storing vicinity feature values of the data records, said vicinity feature values indicating a correspondence between data characters of the data records; and
- second means for obtaining matching degrees for the data records indicating a degree of correspondence between the data record vicinity feature values stored in said first means and a vicinity feature value of the search key, said vicinity feature value of the search key indicating a correspondence between data characters of the search key, and for providing as search results of said data base retrieval system data record numbers and corresponding matching degrees for the data records.

21. A system according to claim 20, wherein said searching means provides said data record numbers and corresponding matching degrees in a descending numerical order of said matching degrees.

22. A system according to claim 20, further comprising means for extracting the vicinity feature values of the data records from the search object by a convolution calculation among data characters of the search object.

23. A system according to claim 20, further comprising means for extracting the vicinity feature value of the search key by a convolution calculation among data characters of the search key.

24. A system according to claim 20 wherein the vicinity feature values of the data records are calculated in a similar manner as the vicinity feature value of the search key.

25. A system according to claim 20, wherein a quantization value x associated with a j-th data character $C_{i,j}$ in an i-th data record of the search object, and a quantization value y associated with k data characters $C_{i,j+1}$, $C_{i,j+2}$, $C_{i,j+k}$ in the vicinity of the data character $C_{i,j}$ are obtained by:

$$x = f(C_{i,j})$$
$$Y = g(C_{i,j}, C_{i,j+1}, C_{i,j+2}, \ldots C_{i,j+k})$$

wherein f(A) and g(B) are functions of A and B, respectively, wherein i, j and k are integers, and wherein a data record number i and a significance w(x,y, i) of the data record are stored for each data record in said first means in a location defined by the obtained values x and y.

26. A system according to claim 25, wherein the significance w(x,y, i) is 1.

27. A system according to claim 25, Wherein the quantization value x is expressed by one of n-stage values.

28. A system according to claim 20, wherein quantization values $x = f(c_i)$ and $y = g(c_i, c_{i+j})$ are given to i-th data character $c_i$ of a data sequence of the search object, and data $c_{i+j}$ (j = 1, 2, ...) in the vicinity of the data character $c_i$, the quantization values are used as element numbers of a matrix, one element value (=1) of two values (1, 0) is given to the element numbers, and a bit matrix generated for all i's is used as the vicinity feature values.

29. A system according to claim 28, wherein the quantization values $x = f(c_i)$ and $y = g(c_i, c_{i+j})$ are given to i-th data character $c_i$ of a data sequence of the search object, and data $c_{i+j}$ (j = 1, 2, ...) in the vicinity of the data character $c_i$, an element value of the corresponding element number of the bit matrix is checked using the quantization values as the element numbers of the matrix, when the element value is 1, +1 is counted as the matching degree, and the matching degrees for all i's are obtained in units of records.

30. A system according to claim 20, further comprising means for converting data characters of the search object and the search key into integer data characters in which each data character is n-gradation data.

31. A system according to claim 30, wherein n=256.

32. A system according to claim 30, further comprising:
- means for dividing said integer data characters by a predetermined value, said integer data characters being arranged in an ascending order of value;
- means for comparing a new quotient obtained by said means for dividing with a previously stored old quotient, and when the new quotient is larger than the old quotient, providing a difference between the new and old quotients;
- a compressed data memory, storing, when said means for comparing provides a difference between the new and old quotients, a remainder obtained by said means for dividing together with the difference between the new and old quotients, and storing, when said means for comparing does not provide a difference between the new and old quotients, only the remainder obtained by said means for dividing; and
- a decoder decoding original integer character data on the basis of the difference data and the remainder data stored in said compressed data memory.

33. A system according to claim 32, wherein when the new quotient is larger than the old quotient, said means for comparing provides the difference between the new and old quotients together with a mark indicating a carry.

34. A system according to claim 25, further comprising:
- means for sequentially storing variable-length data corresponding to data records of said search object;
- means for assigning identification numbers to the variable-length data stored in said means for sequentially storing; and
- means for storing storage locations of the variable-length data in said means for sequentially storing in correspondence with the identification numbers assigned by said means for assigning;
- wherein when data is stored in said means for sequentially storing, the identification number and storage location of the data is stored said means for storing storage locations, and when data is to be read from said means for sequentially storing, the storage location of the data is read from said means for storing storage locations memory means to access said means for sequentially storing.

35. A system according to claim 34, further comprising means for temporarily storing data read from said means for sequentially storing.

36. A system according to claim 25, further comprising:
- means for searching a data base using the search key to obtain matching degrees between the search key and each of the data records;
- a comparator comparing the matching degrees obtained by the searching means of each of the data records with a predetermined threshold value;
- means for preparing a list of data records which are determined by said Comparator to have matching degrees larger than the threshold value; and
- means for storing as search results the list of data records prepared by said means for preparing a list.

37. A system according to claim 36, further comprising means for sorting the data records in a descending numerical order of the matching degrees.

38. A system according to claim 25, further comprising:
- means for performing full-record searching under predetermined conditions;
- search result memory storing search results of said means for performing full-record searching; and
- means for performing conditional searching using the search results stored in said search result memory;
- wherein said conditional search means of performing conditionally searching searches under conditions as a combination of the conditions used in the searching of said means for performing full-record searching, on the basis of the search results stored in said search result memory.

39. A system according to claim 38, further comprising means for inputting the conditions.

* * * * *

UNITED STATES PATENT AND TRADEMARK OFFICE
CERTIFICATE OF CORRECTION

PATENT NO. : 5,450,580
DATED : 12 September 1995
INVENTOR(S) : Hiroshi TAKADA

Page 1 of 2

It is certified that error appears in the above-identified patent and that said Letters Patent is hereby corrected as shown below:

TITLE PAGE: Line 3 of title, change "VALVES" to --VALUES--.

| Column | Line | |
|---|---|---|
| 1 | 3 | Change "VALVES" to --VALUES--. |
| 6 | 7 | Insert --...This is a pen. ...--. |
| 6 | 35 | After "$y=g(C_{i,j},$" insert --$C_{i,j+1},$--. |
| 8 | 1 | Change "84\|104\|105!..." to --84\|104\|105\|...--. |
| 9 | 62 | After "extractor" insert --34,--. |
| 11 | 51 | Change "74°" to --74.--. |
| 12 | 62 | Change "4." to --84.--. |

UNITED STATES PATENT AND TRADEMARK OFFICE
CERTIFICATE OF CORRECTION

PATENT NO. : 5,450,580
DATED : 12 September 1995
INVENTOR(S) : Hiroshi TAKADA

It is certified that error appears in the above-identified patent and that said Letters Patent is hereby corrected as shown below:

| Column | Line | |
|---|---|---|
| 15 | 45 | Change "$x=f(c_{i,j})$" to --$x=f(C_{i,j})$--. |
| 17 | 48 | After "$C_{i,j+2}$," insert --...--. |
| 17 | 60 | Change "Wherein" to --wherein--. |
| 18 | 60 | After "stored" insert --in--. |

Signed and Sealed this

Seventh Day of May, 1996

Attest:

BRUCE LEHMAN

Attesting Officer

Commissioner of Patents and Trademarks